(12) United States Patent
Smith

(10) Patent No.: US 8,126,676 B2
(45) Date of Patent: Feb. 28, 2012

(54) DOOR MONITORING SYSTEM

(75) Inventor: Becky Lou Smith, Arlingnton, WA (US)

(73) Assignee: The Boeing Company, Chicago, IL (US)

( * ) Notice: Subject to any disclaimer, the term of this patent is extended or adjusted under 35 U.S.C. 154(b) by 289 days.

(21) Appl. No.: 12/035,564

(22) Filed: Feb. 22, 2008

(65) Prior Publication Data
US 2009/0216485 A1 Aug. 27, 2009

(51) Int. Cl.
*G01C 9/00* (2006.01)
*G06F 11/00* (2006.01)
(52) U.S. Cl. ......... 702/151; 702/152; 702/153; 702/188
(58) Field of Classification Search .......... 702/113–123, 702/150–159, 179–189, 2
See application file for complete search history.

(56) References Cited

U.S. PATENT DOCUMENTS 6,062,079 A * 5/2000 Stewart ........................... 73/488
(Continued)

*Primary Examiner* — Phuong Huynh
(74) *Attorney, Agent, or Firm* — Klintworth & Rozenblat IP LLC

(57) ABSTRACT

A system for monitoring an angle of a door is provided comprising: an angle measuring device for measuring an angle of a door and transmitting a signal representing the measured angle; a computer for receiving from the angle measuring device the signal representing the measured angle; and computer software for determining and at least one of displaying and recording the measured angle based on the signal received by the computer.

26 Claims, 2 Drawing Sheets

U.S. PATENT DOCUMENTS

| | | | |
|---|---|---|---|
| 6,070,832 A * | 6/2000 | Redd | 244/137.3 |
| 6,697,638 B1 * | 2/2004 | Larsson et al. | 455/553.1 |
| 2004/0056652 A1 * | 3/2004 | Bomya | 324/207.17 |
| 2007/0245578 A1 | 10/2007 | Clark | |
| 2008/0042810 A1 * | 2/2008 | Nakane et al. | 340/426.18 |
| 2008/0294314 A1 * | 11/2008 | Morris et al. | 701/49 |

\* cited by examiner

DOOR MONITORING SYSTEM

BACKGROUND

When doors are installed onto structures, such as aircraft doors, it is important to avoid exceeding the angle tolerance of the door relative to the structure. This may avoid damage to the door attachment mechanism, such as hinges which may attach the door to the structure. Some of the prior art systems utilize angular encoders which may be installed onto the door to determine the angle measurement of the door during installation of the door to the structure. However, encoder systems and other types of systems may be difficult to install, may be difficult to read, may not provide instructions and/or warnings to the installer to avoid exceeding the angle tolerance of the door, and/or may have one or more other types of problems.

A system and/or method for monitoring an angle of a door is needed to decrease and/or eliminate one or more problems of one or more of the prior art systems and/or methods.

SUMMARY

In one aspect of the disclosure, a system for monitoring an angle of a door comprises: an angle measuring device for measuring an angle of a door and transmitting a signal representing the measured angle; a computer for receiving from the angle measuring device the signal representing the measured angle; and computer software for determining and at least one of displaying and recording the measured angle based on the signal received by the computer.

In another aspect of the disclosure, a method of monitoring an angle of a door is provided. In one step, an angle of a door is measured using an angle measuring device. In another step, a signal representing the measured angle of the door is sent from the angle measuring device to a computer. In an additional step, the measured angle of the door is determined using the computer and computer software to interpret the signal. In yet another step, the measured angle of the door is at least one of displayed and recorded using the computer and the computer software.

The features, functions, and advantages can be achieved independently in various embodiments of the present disclosure or may be combined in yet other embodiments.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
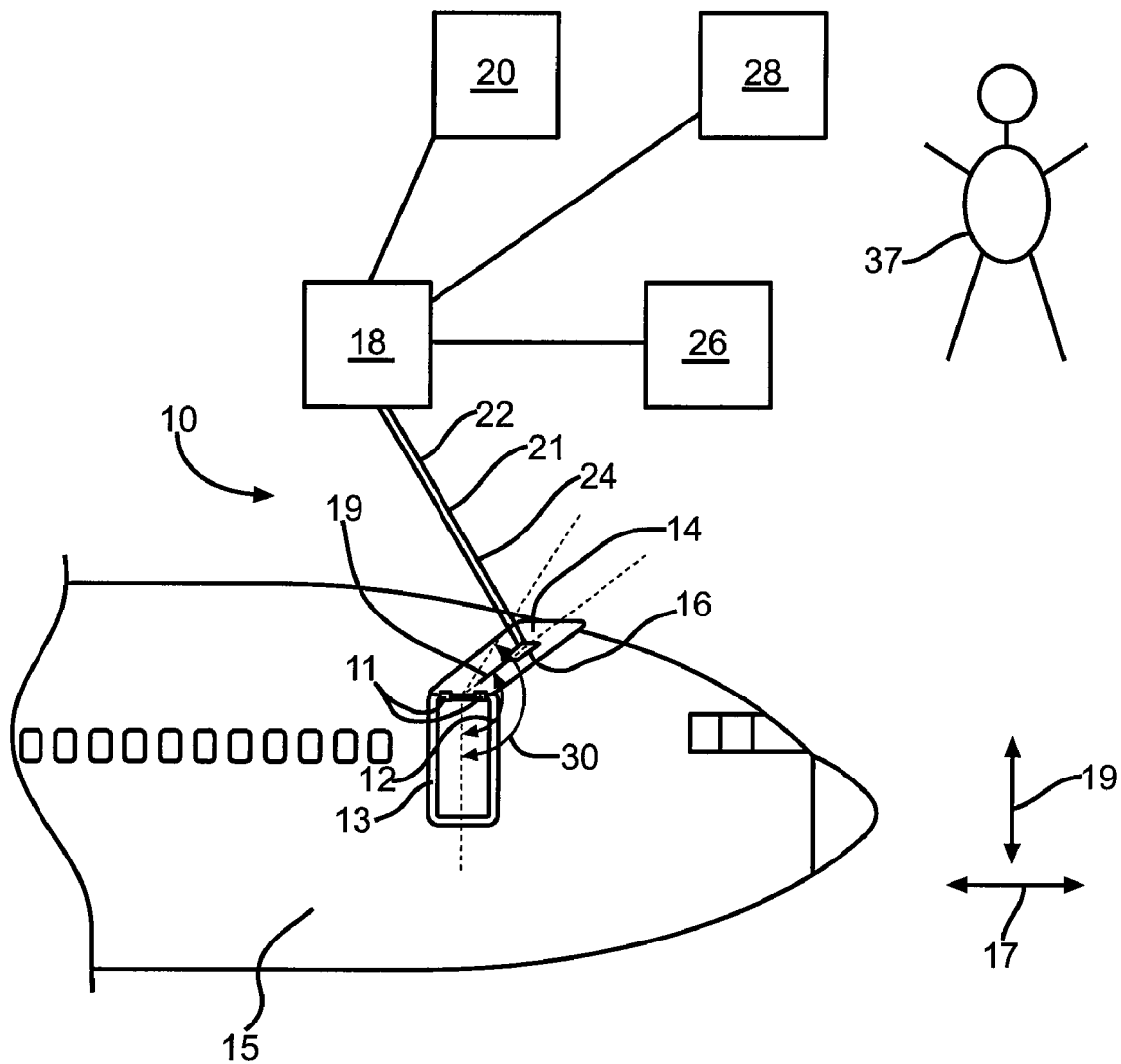
FIG. 1 shows a perspective view of a system for monitoring an angle of a door.

FIG. 1 shows a perspective view of a system 10 for monitoring an angle 12 of a door 14. The system 10 may be portable, and may comprise an angle measuring device 16, a computer 18, and computer software 20. The system 10 may be used to monitor the angle 12 of the door 14 during installation of the door 14 to a structure 15. The door 14 may be connected to the structure 15 with one or more hinges 11 in order to move relative to the structure 15 and/or a door frame 13 in a horizontal direction 17 and/or a vertical direction 19. The angle 12 may show how far the door 14 is open in a horizontal direction 17 and/or a vertical direction 19 relative to at least one of the door frame 13 and the structure 15. The structure 15 may comprise a vehicle, an aircraft, and/or another type of structure.

The angle measuring device 16 may comprise at least one of a tilt sensor, a liquid-filled angle sensor, an inclinometer, a level device such as a PRO 3600, and/or another type of angle measuring device. The angle measuring device 16 may be configured to continually measure the angle 12 of the door 14 and to transmit a signal 21 representing the measured angle 12 to the computer 18. The transmitted signal 21 may be digital or analog. The angle measuring device 16 may be attached to the door 14 using one or more attachment members 19. The one or more attachment members 19 may comprise an adhesive, a bolt, a magnet, a tie, a pin, a snap-fit, and/or another type of attachment member.

The computer 18 may be configured to receive the signal 21 from the angle measuring device 16. The computer 18 may comprise a display 26 and/or a data log 28. The system 10 may further comprise a cable 22 and/or a wireless interface 24 for transmitting the signal 21 from the angle measuring device 16 to the computer 18.

The computer software 20 may be configured to continually determine the measured angle 12 based on the signal 21 received by the computer 18. The computer software 20 may be configured to display the measured angle 12 on the display 26 of the computer 18, and/or to provide instructions to a user 37 installing the door 14 through audio and/or visual mechanisms. The computer software 20 may be configured to log, record, and/or to monitor changes in the measured angle 12 using the data log 28 for installation and/or quality control purposes.

The computer software 20 may be configured to determine an angle tolerance 30 for the door 14. For purposes of this disclosure, the term angle tolerance 30 may be defined as the measured angle 12 of the door 14 relative to the structure 15 at which or above the probability of damage to the door 14 may be substantial. The computer software 20 may be additionally configured to: instruct a user 37 during installation of the door 14, such as to instruct the user 37 as to what actions to take based on the measured angle 12 at that point in time (i.e. instruct as to how quickly the measured angle 12 is changing; instruct as to whether or not to proceed with installation based on the measured angle 12 relative to the angle tolerance 30; instruct as to whether or not the door 14 should be moved to increase or decrease the measured angle 12; and/or provide other instructions); issue at least one of an instruction to stop installation and a warning if the measured angle 12 nears the angle tolerance 30; prevent the door 14 from opening further if the measured angle 12 is at least one of near and at the angle tolerance 30; and/or issue a visual and/or audio warning if the angle tolerance 30 is exceeded.

Figure 2:
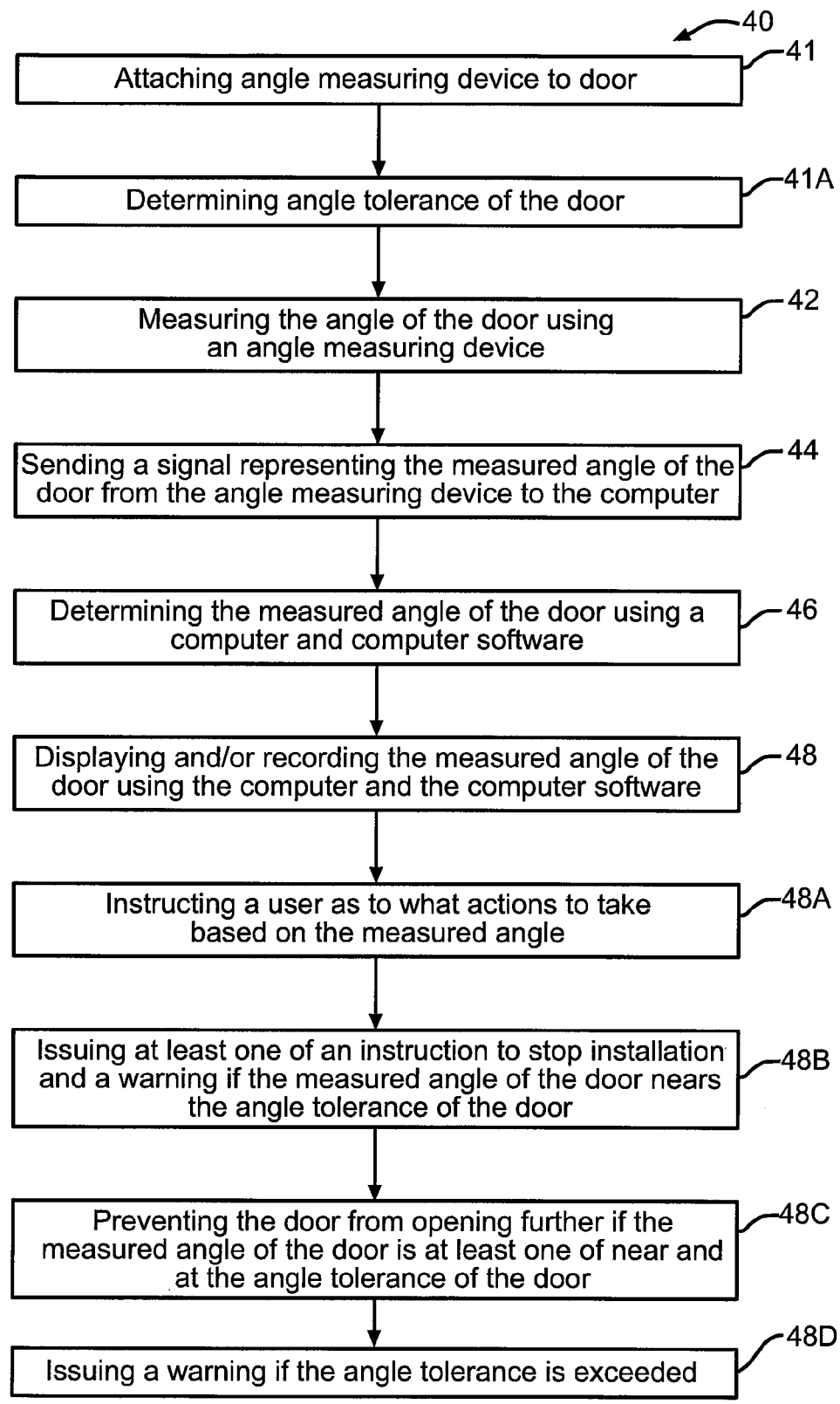
FIG. 2 shows a flowchart of one embodiment of a method of monitoring an angle of a door.

FIG. 2 shows a flowchart of one embodiment of a method 40 of monitoring an angle 12 of a door 14. The method 40 may be followed during installation of the door 14 to a structure 15. In one step 41, an angle measuring device 16 may be attached to the door 14 using one or more attachment members 19 such as an adhesive, a magnet, a tie, a bolt, a pin, a snap-fit, and/or another type of attachment member. The angle measuring device 16 may comprise a tilt sensor, a liquid-filled angle sensor, an inclinometer, a level device, and/or another type of angle measuring device.

An additional step 41A, implemented by the computer 18 and computer software 20, may comprise determining an angle tolerance 30 of the door 14. This determination may be made by the user 37 identifying and/or inputting the type of door 14, the type of structure 15, and/or the angle tolerance 30 of the door 14 itself into the computer 18.

In another step 42, the angle 12 of the door 14 may be measured using an angle measuring device 16. Step 42 may comprise measuring the angle 12 to determine how far the door 14 is open in a horizontal direction 17 and/or a vertical direction 19 relative to a door frame 13, and/or a structure 15 such as a vehicle, an aircraft, and/or another type of structure.

In still another step 44, a signal 21 representing the measured angle 12 of the door 14 may be sent from the angle measuring device 16 to the computer 18. Step 44 may comprise sending the signal 21 from the angle measuring device 16 to the computer 18 using at least one of a cable 22, a wireless interface 24, and/or another type of device.

In an additional step 46, the measured angle 12 of the door 14 may be determined using the computer 18 and computer software 20 which may interpret and analyze the signal 21 to arrive at a precise angle measurement 12 at that point in time. In yet another step 48, the measured angle 12 of the door 14 may be displayed and/or recorded using the computer 18 and computer software 20. Step 48 may comprise displaying the measured angle 12 on a computer display 26. Step 48 may also comprise logging, recording, and/or monitoring changes in the measured angle 12 using a data log 28 for quality insurance purposes.

An additional step 48A, implemented by the computer 18 and computer software 20, may comprise instructing a user 37 during installation of the door 14 as to what actions to take based on the measured angle 12 at that point in time. Step 48A may comprise one or more of the following: instructing the user 37 as to how quickly the measured angle 12 is changing; instructing the user 37 as to whether or not to proceed with installation based on the measured angle 12 relative to the angle tolerance 30; instructing the user 37 as to whether or not the door 14 should be moved to increase or decrease the measured angle 12; and/or providing other instructions to the user 37.

Yet another step 48B, implemented by the computer 18 and computer software 20, may comprise issuing at least one of an instruction to stop installation and a warning if the measured angle 12 of the door 14 nears the angle tolerance 30 of the door 14. An additional step 48C, implemented by the computer 18 and computer software 20, may comprise preventing the door 14 from opening further if the measured angle 12 of the door 14 is at least one of near and at the angle tolerance 30 of the door 14. Still another step 48D, implemented by the computer 18 and computer software 20, may comprise issuing a warning if the angle tolerance 30 is exceeded. Steps 48, 48A, 48B, 48C, and 48D may utilize a graphical display 26 and/or audio to inform the user 37, to issue instructions to the user 37, and/or to issue warnings to the user 37.

One or more embodiments of the disclosure may assist in installing a door 14 to a structure 15 by the following: showing a user 37 installing the door 14 a continual read-out on a display 26 as to what the measured angle 12 is at that point in time; instructing the user 37 during installation using video and/or audio instructions; providing warnings during installation using video and/or audio warnings; decreasing the likelihood of damage to the door 14 or structure 15 during installation; recording the angle measurements 12 in a data log 28 for quality control purposes; and/or providing one or more additional benefits over one or more of the prior art devices and/or methods.

Other aspects and features of the disclosure can be obtained from a study of the drawings, the disclosure, and the appended claims. It should be understood, of course, that the foregoing relates to exemplary embodiments of the disclosure and that modifications may be made without departing from the spirit and scope of the disclosure as set forth in the following claims.

The invention claimed is:

1. A system for avoiding damage to a door or structure during installation of the door to the structure comprising:
   an angle measuring device for continually measuring an angle at which the door is open, relative to the structure, during the installation of the door to the structure, and for continually transmitting a signal representing the continually measured angle; and
   a computer for continually receiving from the angle measuring device, during the installation of the door to the structure, the continually transmitted signal representing the continually measured angle, for continually determining, based on the continually transmitted signal, the continually measured angle at which the door is open relative to the structure during the installation, and for preventing the continually measured angle from exceeding an angle tolerance, at which the door or the structure will be damaged, in order to avoid damage to the door or the structure during the installation of the door to the structure.

2. The system of claim 1 wherein the system is used during the installation of a vehicle door to a vehicle to prevent damage to the vehicle door or the vehicle resulting from the installation.

3. The system of claim 2 wherein the system is used during the installation of an aircraft door to an aircraft to prevent damage to the aircraft door or the aircraft resulting from the installation.

4. The system of claim 1 wherein the angle measuring device is attached to the door.

5. The system of claim 4 wherein the angle measuring device is attached to the door using at least one of an adhesive, a magnet, a tie, a bolt, a pin, or a snap-fit.

6. The system of claim 1 wherein the angle measuring device comprises at least one of a tilt sensor, a liquid-filled angle sensor, an inclinometer, or a level device.

7. The system of claim 1 further comprising at least one of a cable or a wireless interface for continuously transmitting the signal from the angle measuring device to the computer.

8. The system of claim 1 wherein the computer comprises a display for instructing an installer installing the door to the structure based on the determined continually measured angle.

9. The system of claim 1 wherein the computer comprises a data log for logging, recording, and monitoring the continuously measured angle.

10. The system of claim 1 wherein the computer comprises a display for continually displaying the continually determined measured angle at which the door is open as the door is being installed to the structure.

11. The system of claim 1 wherein the system is portable.

12. The system of claim 1 wherein the computer is further for continually recording the continually determined measured angle at which the door is open as the door is being installed to the structure.

13. The system of claim 1 wherein the computer is further for determining the angle tolerance for which, if the continually determined measured angle at which the door is open as the door is being installed to the structure exceeds the determined angle tolerance, the door or the structure will be damaged.

14. The system of claim 1 wherein the computer is further for instructing an installer during the installation of the door to the structure, as the door is being installed to the structure, based on the continually determined measured angle at which the door is open in order to avoid damage to the door or structure resulting from the installation.

15. The system of claim 1 wherein the computer is further for issuing to an installer at least one of an instruction to stop the installation of the door to the structure or a warning if the continually determined measured angle, at which the door is open as the door is being installed to the structure, at least one of nears, is at, or exceeds the angle tolerance at which at least one of the door or the structure will be damaged.

16. A method of avoiding damage to a door or structure during installation of the door to the structure comprising:
continually measuring an angle of the door relative to the structure, during the installation of the door to the structure, using an angle measuring device;
continually sending a signal from the angle measuring device to a computer, during the installation of the door to the structure, representing the continually measured angle;
continually determining using the computer, during the installation of the door to the structure, the continually measured angle based on the continually sent signal; and
preventing the continually measured angle from exceeding an angle tolerance, at which the door or the structure will be damaged, during the installation of the door to the structure in order to avoid damage to the door or the structure.

17. The method of claim 16 further comprising attaching the angle measuring device to the door using at least one of an adhesive, a magnet, a tie, a bolt, a pin, or a snap-fit.

18. The method of claim 16 wherein the angle measuring device comprises at least one of a tilt sensor, a liquid-filled angle sensor, an inclinometer, or a level device.

19. The method of claim 16 wherein the sending step further comprises sending the signal from the angle measuring device to the computer using at least one of a cable or a wireless interface.

20. The method of claim 16 further comprising continually displaying, using the computer, the continually determined measured angle during the installation of the door to the structure.

21. The method of claim 16 further comprising continually recording, using the computer, the continually determined measured angle during the installation of the door to the structure.

22. The method of claim 16 further comprising using the computer to determine the angle tolerance at which, if the continually determined measured angle at which the door is open as the door is being installed to the structure exceeds the determined angle tolerance, at least one of the door or the structure will be damaged.

23. The method of claim 16 further comprising using the computer to instruct an installer, as the door is being installed to the structure, based on the continually determined measured angle in order to avoid damage resulting from the installation.

24. The method of claim 16 further comprising using the computer to issue to an installer at least one of a warning or an instruction to stop the installation of the door to the structure if the continually determined measured angle, at which the door is open during the installation of the door to the structure, at least one of nears, or is at the angle tolerance at which at least one of the door or the structure will be damaged.

25. The method of claim 16 wherein the method is implemented during the installation of a vehicle door to a vehicle to prevent damage to the vehicle door or the vehicle resulting from the installation.

26. The method of claim 25 wherein the method is implemented during the installation of an aircraft door to an aircraft to prevent damage to the aircraft door or the aircraft resulting from the installation.

* * * * *